United States Patent Office 3,751,404
Patented Aug. 7, 1973

3,751,404
L-PROLYL-L-ARGINYL-L-VOLYL-L-TYROSYL-L-VOLYL-L-HISTIDYL-L-PROLYL-GLYCINE
Frank Sipos, East Brunswick, N.J., Donald T. Pals, Columbia, Mo., and George S. Denning, Jr., Norwich, N.Y., assignors to Morton-Norwich Products, Inc.
No Drawing. Continuation-in-part of applications Ser. No. 43,595, June 4, 1970, and Ser. No. 17,920, Mar. 9, 1970. This application Feb. 12, 1971, Ser. No. 115,045
Int. Cl. C07c 103/52
U.S. Cl. 260—112.5                                   1 Claim

ABSTRACT OF THE DISCLOSURE

Novel hepta- and octapeptides of the formula:

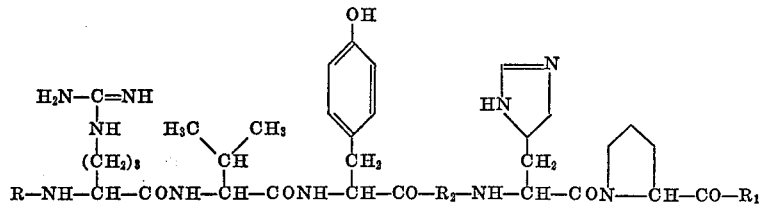

wherein R is hydrogen, succinyl, L-aspartyl, sarcosyl, L-seryl, succinamyl, L-prolyl, glycyl, or D- or L-asparaginyl; $R_1$ is an L-alanine, L- or D-leucine, glycine, L-isoleucine or β-alanine residue; and $R_2$ is L-valyl, or L-alanyl upon intravenous infusion to animals inhibit blood pressure response to angiotensin amide.

---

This application is a continuation-in-part of our copending applications Ser. No. 43,595, filed June 4, 1970, and Ser. No. 17,920, filed Mar. 9, 1970.

This invention relates to polypeptides. More particularly it is concerned with hepta- and octapeptides of the formula:

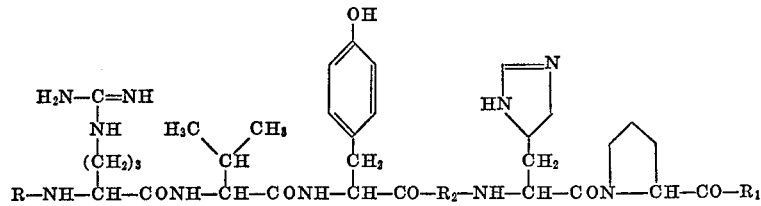

wherein R is hydrogen, succinyl, L-aspartyl, sarcosyl, L-seryl, succinamyl, L-prolyl, glycyl, or D- or L-aspraginyl; $R_1$ is an L-alanine, L- or D-leucine, glycine, L-isoleucine or β-alanine residue; and $R_2$ is L-valyl, or L-alanyl.

The peptides of this invention possess pharmacological activity. They are capable of inhibiting the pressor effect of angiotensin amide upon blood pressure. Thus when administered by intravenous infusion to pithed rats in a very small amount of 20 mcg./kg./min., the pressor effect of angiotensin amide similarly administered is inhibited. By virtue of this inhibitory property upon angiotensin amide induced blood pressure elevation, the peptides of this invention are valuable agents for counteracting hypertension due to angiotensin amide. They are also capable of inhibiting hypertension in acute unilateral renal hypertensive rats upon intravenous infusion.

The hepta- and octapeptides of this invention are readily prepared in accordance with known methods for preparing peptides. Such methods involve the building of a linear chain of amino acids through repetitive amide linkages employing in such sequential alignment the necessary protective groups susceptible of ready removal by conventional cleavage methods. The adaptation of such methods to the peptides of this invention is described hereinafter in exemplary fashion by the following:

L-Asparaginyl-L-arginyl-L-valyl-L-tyrosyl-L-valyl-L-histidyl-L-prolyl-L-alanine

BOC-Asn-Arg($NO_2$) - Val - Tyr(O-Bzl)-Val-His($N^{im}$-Bzl)-Pro-Ala-polymer(A).—BOC-Ala-resinester (5 g., 0.5 mMol/g.) was placed in a rocking type 200 ml. Merrifield reaction vessel. The resin was swelled in chloroform (analytical grade) by rocking for 20 min. and thereafter washed with three 50 ml. portions of glacial acetic acid. The duration of each wash operation was 3–5 min. The t-butoxycarbonyl (BOC) protecting group was removed by 1N HCl in anhydrous acetic acid by rocking for 40 min. The resin was successively washed three times each with acetic acid, absolute ethanol and with N,N-dimethylformamide. The resulting hydrachloride of ananyl-resinester was neutralized with 10% solution of triethylamine in dimethylformamide by rocking for 10 min. Thereafter the resin was washed with three portions each of dimethylformamide, abs. ethanol, chloroform and methylenechloride and the solution of 8.5 mMol (three fold excess) of BOC-proline in 40 ml. of methylenechloride was added. A 20 min. rocking period was allowed to give time for the amino acid derivative to penetrate the resin. Then 8.5 mMol of N,N'-dicyclohexyl-carbodiimide (DDC) in 10 ml. methylenechloride was added and the coupling was allowed to proceed for 12 hours with rocking. Thereafter the resin was washed with three portions each of methylenechloride, absolute ethanol and acetic acid and so was prepared for the next deprotection step with HCl in acetic acid as described above. The washing, neutralization and coupling steps were performed by the described method using BOC-His($N^{im}$Bzl)-OH, BOC-Val-OH, BOC-Tyr(O-Bzl)-OH and BOC-Arg($NO_2$)-OH. Change was made in the coupling steps of the BOC-His($N^{im}$-Bzl)-OH and BOC-Arg($NO_2$)-OH in which cases a dimethylformamide-methylenechloride (2:1) mixture was used as solvent. The coupling of Asn to the deprotected resin-heptapeptide was performed using BOC-Asn-ONP (BOC-Asparagine-p-nitrophenyl-ester) in dimethylformamide by rocking the mixture for 72 hours.

After the last coupling step the resin-peptide was washed with dimethylformamide, ethanol, acetic acid and ethanol and dried in vacuo over $P_2O_5$. The weight of the resin-peptide was 7.3 g.

H-Asn-Arg($NO_2$) - Val - Tyr(O - Bzl)-Val-His($N^{im}$-Bzl)-Pro-Ala-OH·2HBr(B).—The resin-peptide I (7.3 g.), prepared as described above, was suspended in 25 ml. dry trifluoroacetic acid and a stream of dry HBr was passed through at a slow rate. After 20 min. the resin was filtered off and treated once more with HBr/$CF_3$COOH for 40 min. The filtrates were evaporated to dryness in vacuo at 20°, the oily residues were precipitated with abs. ether and the product was dried in desiccator over potassium hydroxide. The overall yield was 1980 mg. (59.8%) of the protected octapeptidedihydrobromide.

H-Asn-Arg-Val-Tyr-Val-His-Pro - Ala - OH (C).—The protected peptide (B) (1.0 g.) was dissolved in 20 ml. of an acetic acid-dioxane-water (4:4:1, v./v.) mixture and hydrogenolysed over Pd/BaSO$_4$ (10% catalyst (0.5 g.)) for 48 hrs. at atmospheric pressure. After that time a new portion (0.2 g.) of catalyst was added and the hydrogenation was continued for 24 hours. The filtered and diluted solution was lyophilized. The yield was 750 mg. (M.P. 150–165°). (Calcd. for dihydrobromide: 15.32% Br: Found: 13.36% Br.)

The crude product was purified by gel permeation chromatography on Sephadex G–25 in 0.2 M acetic acid. The fractions containing the pure peptide were combined and lyophilized. The purified compound contains only a trace of halogen.

TLC: Merck Cellulose F plates, n-butanol-acetic acid-water (6:2:3 v./v.) solvent system, R$_f$ 0.35 Merck Silica Gel F–254 plates with the same solvent system, R$_f$ 0.13

$[\alpha]_D^{20} = -59.4$ (c.=0.2, IN AcOH)
$[\alpha]_{578}^{20} -61.1$ (c.=0.2, IN AcOH)

Amino acid analysis: Ala: 1.00; Arg: 1.00; Asn: 1.09; His: 0.90; Pro: 1.04; Tyr: 0.75; Val: 1.94.

In similar fashion other peptides of this invention were prepared by introducing the requisite unit at the appropriate stage. The peptides thus prepared are set forth in the tables herebelow:

TABLE I

| Peptide (formula, mol. weight) | Specific rotation (concentration, solvent) | TLC on Merck Silica Gel F-254 plates | TLC on Merck Cellulose F-254 plates |
|---|---|---|---|
| | | Butanol-acetic acid-water (6:2:3 v./v.) ninhydrin detection | |
| | | R$_f$ | R$_f$ |
| H-asn-Arg-Val-Tyr-Val-His-Pro-Ala-OH (C$_{43}$H$_{66}$N$_{14}$O$_{11}$, m.w. 955.1) | $[\alpha]_D^{23}=-81.33$ (c.=0.22, IN Ac OH) | 0.20 | 0.50 |
| H-Asn-Arg-Val-Tyr-Val-His-Pro-Leu-OH (C$_{46}$H$_{72}$N$_{14}$O$_{11}$, m.w. 997.2) | $[\alpha]_D^{23}=-70.55$ (c.=1, IN AcOH) | 0.15 | 0.65 |
| H-asn-Arg-Val-Tyr-Val-His-Pro-Leu-OH (C$_{46}$H$_{72}$N$_{14}$O$_{11}$, m.w. 997.2) | $[\alpha]_D^{26}=-87.32$ (c.=0.2, IN Ac OH) | 0.10 | 0.60 |
| Succinyl-Arg-Val-Tyr-Val-His-Pro-Ala-OH (C$_{43}$H$_{64}$N$_{12}$O$_{12}$, m.w. 941.1) | $[\alpha]_D^{23}=-64.90$ (c.=1, IN Ac OH) | ¹ 0.40 | ¹ 0.70 |
| H-Asp-Arg-Val-Tyr-Val-His-Pro-Ala-OH (C$_{43}$H$_{64}$N$_{13}$O$_{12}$, m.w. 956.1) | $[\alpha]_D^{23}=-101.62$ (c.=0.3, IN Ac OH) | 0.03 | 0.45 |
| H-Arg-Val-Tyr-Val-His-Pro-Ala-OH (C$_{39}$H$_{60}$N$_{12}$O$_9$, m.w. 841.0) | $[\alpha]_D^{24}=-68.31$ (c.=0.24 IN Ac OH) | 0.02 | 0.20 |

¹ Pauly's reagent.

TABLE II

| Peptide (formula, mol. weight) | Specification rotation (concentration, solvent) | TLC on Merck Silica Gel F-254 plates (ninhydrin detection) | |
|---|---|---|---|
| | | Butanol-acetic acid-water (6:2:3:v./v.) | Butanol-acetic acid-pyridine-water (9:2:7:6:v./v.) |
| H-Sar-Arg-Val-Tyr-His-Pro-Ala-OH (C$_{42}$H$_{65}$N$_{13}$O$_{10}$, m.w. 912.11) | $[\alpha]_D^{23}=-84.41$ (c=0.24, IN AcOH) | 0.05 | 0.30 |
| H-Ser-Arg-Val-Tyr-His-Pro-Ala-OH (C$_{42}$H$_{65}$N$_{13}$O$_{11}$, m.w. 928.11) | $[\alpha]_D^{24}=-69.00$ (c.=0.2, IN AcOH | 0.02 | 0.38 |
| H-Asn-Arg-Val-Tyr-Val-His-Pro-leu-OH (C$_{46}$H$_{72}$N$_{14}$O$_{11}$, m.w. 997.22) | $[\alpha]_D^{19}=54.40$ (c.=0.25, IN AcOH) | 0.15 | 0.50 |
| Succinamyl-Arg-Val-Tyr-Val-His-Pro-Ala-OH (C$_{43}$H$_{65}$N$_{13}$O$_{11}$, m.w. 940.12) | $[\alpha]_D^{21}=-83.14$ (c.=0.25, IN AcOH) | 0.10 | 0.20 |
| H-Asn-Arg-Val-Tyr-Val-His-Pro-Gly-OH (C$_{42}$H$_{64}$N$_{14}$O$_{11}$, m.w. 941.11) | $[\alpha]_D^{23}=-54.90$ (c.=1.0, IN Ac OH) | 0.10 | 0.25 |
| H-Asn-Arg-Val-Tyr-Val-His-Pro-Ile-OH (C$_{46}$H$_{72}$N$_{14}$O$_{11}$, m.w. 997.22) | $[\alpha]_D^{17}=-55.33$ (c.=0.3, IN AcOH) | 0.09 | 0.40 |

TABLE III

| Peptide (formula, mol. weight) | Specific rotation (conc., solvent) | TLC on Merck Silica Gel F-254 plates (Pauly reagent detection) | |
|---|---|---|---|
| | | Butanol-acetic acid-water (6:2:3 v./v.) | Butanol-acetic-acid-water pyridine (9:2:6:7 v./v.) |
| H-Sar-Arg-Val-Tyr-Val-His-Pro-Gly-OH (C$_{41}$H$_{63}$N$_{13}$O$_{10}$, 898.10) | $[\alpha]_D^{26}=-74.6$ (c.=0.57, N AcOH) | 0.15 | 0.25 |
| H-Pro-Arg-Val-Tyr-Val-His-Pro-Gly-OH (C$_{43}$H$_{65}$N$_{13}$O$_{10}$, 924.12) | $[\alpha]_D^{21}=-81.0$ (c.=0.53, N AcOH) | 0.10 | 0.35 |
| H-Asn-Arg-Val-Tyr-Val-His-Pro-Gly-OH (C$_{42}$H$_{64}$N$_{14}$O$_{11}$, 941.11) | $[\alpha]_D^{21}=-67.0$ (c.=0.51, N AcOH) | 0.15 | 0.32 |
| H-Sar-Arg-Val-Tyr-Val-His-Pro-$\beta$-Ala-OH C$_{42}$H$_{65}$N$_{13}$O$_{10}$, 912.10 | $[\alpha]_D^{22}=-59.0$ (c.=0.52, N AcOH) | 0.05 | 0.25 |
| H-Asn-Arg-Val-Tyr-Val-His-Pro-$\beta$-Ala-OH (C$_{43}$H$_{66}$N$_{14}$O$_{11}$, 955.10) | $[\alpha]_D^{22}=-53.7$ (c.=0.53, N AcOH) | 0.15 | 0.45 |
| H-Gly-Arg-Val-Tyr-Val-His-Pro-Ala-OH (C$_{41}$H$_{63}$N$_{13}$O$_{10}$, 898.09) | $[\alpha]_D^{22}=-80.3$ (c.=0.56, N AcOH) | 0.25 | 0.32 |
| H-Sar-Arg-Val-Tyr-Ile-His-Pro-Leu-OH (C$_{46}$H$_{73}$N$_{13}$O$_{10}$, 968.22) | $[\alpha]_D^{17}=-56.7$ (c.=0.30, N AcOH) | 0.15 | 0.45 |
| H-Asn-Arg-Val-Tyr-Ile-His-Pro-Leu-OH (C$_{47}$H$_{74}$N$_{14}$O$_{11}$, 1011.25) | $[\alpha]_D^{21}=-77.5$ (c.=0.54, N AcOH) | 0.25 | 0.35 |

TABLE III—Continued

| Peptide (formula, mol. weight) | Specific rotation (conc., solvent) | TLC on Merck Silica Gel F-254 plates (Pauly reagent detection) | |
|---|---|---|---|
| | | Butanol-acetic acid-water (6:2:3 v./v.) | Butanol-acetic-acid-water pyridine (9:2:6:7 v./v.) |
| H-Sar-Arg-Val-Tyr-Ile-His-Pro-Ala-OH ($C_{43}H_{67}H_{13}O_{10}$, 926.14) | $[\alpha]_D^{21} = -80.5$ (c.=0.54, N AcOH) | 0.28 | 0.35 |
| H-Asn-Arg-Val-Tyr-Ile-His-Pro-Ala-OH ($C_{44}H_{68}N_{14}O_{11}$, 969.17) | $[\alpha]_D^{22} = -63.7$ (c.=0.52, N AcOH) | 0.10 | 0.38 |
| H-Asn-Arg-Val-Tyr-Val-His-Pro-Ala-OH ($C_{43}H_{66}N_{14}O_{11}$, 955.14) | $[\alpha]_D^{19} = -48.4$ (c.=0.25, N AcOH) | 0.05 | 0.30 |
| H-Asn-Arg-Val-Tyr-Ala-His-Pro-Ala-OH ($C_{41}H_{62}N_{14}O_{11}$, 927.03) | $[\alpha]_D^{22} = -68.2$ (c.=0.50, N AcOH) | 0.10 | 0.35 |

In the above tables, in accordance with IUPAC nomenclature for distinguishing L- and D-forms of amino acids in polypeptides, L-amino acids are denoted by a first capital letter, while D-amino acids are denoted by a first lower case letter.

What is claimed is:
1. The compound

L-prolyl-L-arginyl-L-valyl-L-tyrosyl-
    L-valyl-L-histidyl-L-prolyl-glycine

References Cited

UNITED STATES PATENTS

| | | | |
|---|---|---|---|
| 2,978,444 | 4/1961 | Schwyzer et al. | 260—112.5 |
| 3,014,023 | 12/1961 | Schwyzer et al. | 260—112.5 |
| 3,040,017 | 6/1962 | Schwyzer et al. | 260—112.5 |
| 3,281,406 | 10/1966 | Schwyzer et al. | 260—112.5 |

OTHER REFERENCES

Bumpus et al.: Biochim Biophys. Acta 46, 38–44 (1961).

Park et al.: Biochemistry (Wash.) 6, 3458–3464 (1967).

Bumpus et al.: Peptides-Chemistry and Biochemistry, Weinstein et al. eds., Marcel Dekker Inc., New York (1970), pp. 127–150. Effective date: August 1968.

Schroder et al.: The Peptides, vol. II, Academic Press, New York (1966), pp. 47–62.

Khairallah et al.: J. Med. Chem. 13, 181–184 (1970).

Khosla et al.: Biochemistry (Wash.) 1, 3417–3421 (1968).

ELBERT L. ROBERTS, Primary Examiner

U.S. Cl. X.R.

424—177